United States Patent
Kellner et al.

(10) Patent No.: US 12,424,697 B2
(45) Date of Patent: Sep. 23, 2025

(54) BATTERY MODULE AND BATTERY SYSTEM WITH BATTERY CELLS SEPARATED BY A HEAT-RESISTANT SEPARATOR PLATE

(71) Applicant: Dr. Ing. h.c. F. Porsche Aktiengesellschaft, Stuttgart (DE)

(72) Inventors: Philipp Kellner, Renningen (DE); Christopher Volkmer, Niefern-Öschelbronn (DE); Philipp Berendes, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 509 days.

(21) Appl. No.: 18/078,176

(22) Filed: Dec. 9, 2022

(65) Prior Publication Data
US 2023/0187763 A1    Jun. 15, 2023

(30) Foreign Application Priority Data
Dec. 10, 2021  (DE) ............ 10 2021 132 608.7

(51) Int. Cl.
*H01M 50/291*  (2021.01)
*H01M 10/625*  (2014.01)
(Continued)

(52) U.S. Cl.
CPC ....... *H01M 50/291* (2021.01); *H01M 10/625* (2015.04); *H01M 10/647* (2015.04);
(Continued)

(58) Field of Classification Search
CPC ........... H01M 10/0481; H01M 10/613; H01M 10/625; H01M 10/647; H01M 10/6555;
(Continued)

(56) References Cited

U.S. PATENT DOCUMENTS

| 10,249,866 B2 | 4/2019 | Seki et al. |
| 2006/0232135 A1 | 10/2006 | Kim et al. |

(Continued)

FOREIGN PATENT DOCUMENTS

| DE | 102018221477 A1 | 6/2020 |
| DE | 102019210191 A1 | 1/2021 |

(Continued)

*Primary Examiner* — Lingwen R Zeng
(74) *Attorney, Agent, or Firm* — Buchanan Ingersoll & Rooney PC

(57) ABSTRACT

A battery module includes a module housing, a cell stack having a plurality of battery cells including a rectangular surface and a cell thickness perpendicular thereto, and a separator plate. A laminar extension of the separator plate corresponds to at least the rectangular surface area of a respective battery cell. The separator plate is arranged between two adjacent battery cells of the at least one cell stack. On at least one separator plate side of the at least one separator plate between a lower and an upper edge of the at least one separator plate, at least two strip-shaped compression pads are arranged. The at least two strip-shaped compression pads directly abut the battery cell such that, longitudinally between the at least two strip-shaped compression pads, the at least one separator plate, and the respective battery cell, a respective flow channel is formed for a temperature control fluid.

11 Claims, 3 Drawing Sheets

(51) Int. Cl.
*H01M 10/647* (2014.01)
*H01M 10/6555* (2014.01)
*H01M 10/6557* (2014.01)
*H01M 10/6567* (2014.01)
*H01M 10/658* (2014.01)
*H01M 50/209* (2021.01)
*H01M 50/293* (2021.01)
*H01M 10/04* (2006.01)
*H01M 10/613* (2014.01)
*H01M 10/6568* (2014.01)
*H01M 50/242* (2021.01)

(52) U.S. Cl.
CPC ... *H01M 10/6555* (2015.04); *H01M 10/6557* (2015.04); *H01M 10/6567* (2015.04); *H01M 10/658* (2015.04); *H01M 50/209* (2021.01); *H01M 50/293* (2021.01); *H01M 10/0481* (2013.01); *H01M 10/613* (2015.04); *H01M 10/6568* (2015.04); *H01M 50/242* (2021.01); *H01M 2220/20* (2013.01); *Y02E 60/10* (2013.01)

(58) Field of Classification Search
CPC ......... H01M 10/6557; H01M 10/6567; H01M 10/6568; H01M 10/658; H01M 2220/20; H01M 50/209; H01M 50/242; H01M 50/291; H01M 50/293; Y02E 60/10
See application file for complete search history.

(56) References Cited

U.S. PATENT DOCUMENTS

| | | | |
|---|---|---|---|
| 2011/0059347 A1* | 3/2011 | Lee | H01M 50/121 429/120 |
| 2021/0320344 A1 | 10/2021 | Chopard et al. | |
| 2022/0181716 A1 | 6/2022 | Katayama et al. | |

FOREIGN PATENT DOCUMENTS

| | | |
|---|---|---|
| DE | 102019210197 A1 | 1/2021 |
| EP | 3993139 A1 | 5/2022 |
| JP | 2004362879 A | 12/2004 |
| JP | 2014010939 A | 1/2014 |
| JP | 2015220117 A | 12/2015 |
| JP | 6500554 B2 | 3/2019 |
| JP | 2021144879 A | 9/2021 |

\* cited by examiner

BATTERY MODULE AND BATTERY SYSTEM WITH BATTERY CELLS SEPARATED BY A HEAT-RESISTANT SEPARATOR PLATE

CROSS-REFERENCE TO RELATED APPLICATION

This application claims priority to German Patent Application No. 10 2021 132 608.7, filed Dec. 10, 2021, the content of such application being incorporated by reference herein in its entirety.

FIELD OF THE INVENTION

The present invention relates to a coolable battery module having a plurality of battery cells in which a respective heat-resistant separator plate is arranged between adjacent battery cells.

BACKGROUND OF THE INVENTION

Battery cells in electrically or partially electrically operated motor vehicles are actively cooled in the prior art, because, in particular at higher outputs, they can heat up so much that they are damaged. A common method is to expose the battery cells to a direct flow with a dielectric fluid. At the same time, it is known that individual cells can be subjected to a so-called cell crimping, i.e. a spatial or laterally bulbous extension of the prismatic battery cells or pouch cells, which are mostly formed in rectangular, elongated shape, for example by aging processes. In the prior art, in order to ensure a fixation adapted to this thermal process within the battery module, respective compression pads are arranged between two adjacent battery cells, partially formed as plate-like foam pads, but also partially arranged suitably so that flow channels are formed for a cooling fluid to be passed through.

DE 10 2018 221 477 A1, which is incorporated by reference herein, discloses a battery module with a plurality of battery cells, in which a respective separator element is arranged between the battery cells. The separator element has a plurality of elastic compensation elements that contact the respective adjacent battery cells and form respective flow channels for a temperature control liquid spaced apart from one another.

DE 10 2019 210 197 A1, which is incorporated by reference herein, relates to a battery cell stack for a battery module having an intermediate plate arranged between the battery cells. The intermediate plate provides a space for expansion in its shape, in which space a respective adjacent battery cell can expand during a swelling operation.

DE 10 2019 210 191 A1, which is incorporated by reference herein, discusses a battery cell stack of a battery module in which at least one separator plate is arranged so as to abut against at least one battery cell. The respective separator plate together with the battery cell abutting it forms a flow path for a temperature control fluid.

SUMMARY OF THE INVENTION

The compression pads may be progressively compressed over a lifetime of the motor vehicle. Mostly formed from an elastomer, such compression pads provide only a small time lag of a heat propagation from battery cell to battery cell, particularly in case of a thermal event in a single battery cell, because a heat resistance of the materials used for the compression pads is limited. In the directly cooled battery cells considered herein, the cooling fluid surrounding the battery cells leads to a reduction in the heat propagation from battery cell to battery cell. However, between two battery cells, the cooling fluid does not offer a stable solid state layer which absorbs mechanical deformation or passes forces to a surrounding module housing and can therefore be displaced.

In light of the foregoing, it is a task of the present invention to provide a battery module in which adjacently arranged battery cells are thermally delimited from one another. A fire incident or an excessive extension should be prevented or at least delayed. In addition, a battery system including such a battery module is to be provided.

To solve the aforementioned task, a battery module is proposed, wherein the battery module comprises a module housing in whose interior at least one cell stack has a plurality of battery cells, each having a rectangular surface and having a cell thickness perpendicular thereto in the stack direction, and at least one separator plate formed from a heat-resistant material. A laminar extension of the at least one separator plate corresponds to at least the rectangular surface of a respective battery cell, wherein the at least one separator plate is arranged between two adjacent battery cells of the at least one cell stack. On at least one separator plate side of the at least one separator plate, at least two strip-shaped compression pads are arranged between a lower and an upper edge of the at least one separator plate. The at least two strip-shaped compression pads directly abut the battery cell facing the at least one separator plate side with the at least two strip-shaped compression pads, such that a respective flow channel for a temperature control fluid is formed longitudinally between the at least two strip-shaped compression pads, the at least one separator plate, and the respective battery cell. During an operation, the battery module is perfused or perfusable with temperature control fluid flowing through the respective flow channel.

By means of the battery module according to aspects of the invention having at least one heat-resistant separator plate, adjacent battery cells are advantageously thermally isolated from one another, such that a thermal event, for example the igniting of a single battery cell of the battery module, a propagation, i.e. an igniting of further surrounding battery cells, is prevented or at least delayed.

The plurality of battery cells of the battery module according to aspects of the invention is preferably formed with prismatic battery cells. These have a greater length and width compared to their cell thickness, wherein the rectangular surface formed from the length and width represents a lower limit for the rectangular surface of the heat-resistant separator plate according to aspects of the invention. To an extent, dimensions of the module housing perpendicular to the stacking direction are also provided, wherein, in the interior, still further storage space for conduits or flow channels for the temperature control fluid passing through the battery module within the module housing, as well as for power connections of the respective battery cells, is to be provided.

A further known design for the battery cell is the so-called pouch cell in which, for example, a flat lithium-ion accumulator is welded in between two films and is also primarily characterized by its rectangular surface with comparatively low cell thickness. Again, an arrangement according to aspects of the invention of the at least one heat-resistant separator plate between two adjacent pouch cells is conceivable.

The temperature control fluid flowing around the plurality of battery cells is advantageously a dielectric liquid, for example a dielectric oil, which is advantageously heat-resistant and non-flammable. The at least two compression pads are formed with a heat-resistant elastic material.

In one embodiment of the battery module according to aspects of the invention, the heat-resistant material of the at least one separator plate additionally has at least one of the following properties: fire-resistant, burst-resistant, fracture-resistant, pressure-resistant.

In a further embodiment of the battery module according to aspects of the invention, the heat-resistant material of the at least one separator plate is selected from one of the following materials: steel, fiber-reinforced plastic, ceramic, fiber-reinforced ceramic.

In yet another embodiment of the battery module according to aspects of the invention, the at least two compression pads are glued to the at least one separator plate.

In a further embodiment of the method according to aspects of the invention, the at least one separator plate is larger in its laminar extent than a respective battery cell in its laminar extent. As a result, the battery cells are advantageously better spatially separated from one another by the separator plate.

In a further embodiment of the battery module according to aspects of the invention, the at least one separator plate abuts the module housing with at least one edge. Thus, a spatial separation between two adjacent battery cells is advantageously brought about at the respective edge, so that in the event of degassing of an affected battery cell, no or only very little gas can enter the respective adjacent battery cell.

In yet another embodiment of the battery module according to aspects of the invention, a plurality of strip-shaped compression pads are arranged in a strip pattern on the at least one separator plate.

In a further configuration of the battery module according to aspects of the invention, a respective separator plate of the at least one separator plate is arranged in the stacking direction between at least one respective wall of the module housing that terminates the cell stack. The at least two strip-shaped compression pads are only arranged between the respective separator plate and the respective battery cell terminating the cell stack.

Further, a method of manufacturing a battery module is described, wherein the battery module comprises a module housing, at least one cell stack having a plurality of battery cells having a rectangular surface and having a cell thickness perpendicular thereto in the stacking direction, and at least one separator plate formed from a heat-resistant material. A laminar extension of the at least one separator plate corresponds to at least the rectangular surface of a respective battery cell, wherein the at least one separator plate is arranged between two adjacent battery cells of the at least one cell stack. On at least one separator plate side of the at least one separator plate, at least two strip-shaped compression pads are arranged between a lower and an upper edge of the at least one separator plate. The at least two strip-shaped compression pads immediately abut the battery cell facing the at least one separator plate side with the at least one strip-shaped compression pad, such that a respective flow channel for a temperature control fluid is formed longitudinally between the at least two strip-shaped compression pads, the at least one separator plate, and the respective battery cell. During an operation, the battery module is perfused or perfusable with temperature control fluid flowing through the respective flow channel. In a pre-mounting assembly, a plurality of strip-shaped compression pads are glued on the at least one separator plate with a heat-resistant adhesive in order to form a compound structure.

Due to the assembly step according to aspects of the invention, a simple assembly of the battery module according to aspects of the invention is advantageously promoted. It is conceivable that the structure assembled according to aspects of the invention will be inserted into the at least one cell stack already arranged in the module housing in a mounting step.

In one embodiment of the method according to aspects of the invention, the assembled structure is glued to the module housing with a heat-resistant adhesive upon assembly of the battery module at contact locations of the strip-shaped compression pads with the respective battery cells and at contact locations of the at least one separator plate.

It is conceivable that the temperature control fluid is passed between adjacent battery cells through conduits or further flow channels arranged around edges of the separator plate.

Further, a battery system comprising a temperature control system and at least one battery module according to aspects of the invention is described. The temperature control system is configured so as to provide a perfusion of the at least one battery module with a dielectric temperature control fluid.

For example, the temperature control system comprises a liquid pump and is connected to the at least one battery module by a closed conduit system having a temperature control fluid inflow and a temperature control fluid outflow. It is conceivable that, in the case of cool outside temperatures upon start of operation of a vehicle comprising the battery system according to aspects of the invention, the battery cells are initially heated by the temperature control system in order to provide a desired power for a traction of the vehicle. However, in regular operation, the temperature control system is designed so as to remove heat from the battery cells.

The battery system according to aspects of the invention is advantageously a directly cooled battery system with an inexpensive and space-saving intermediate cell cooling in which a so-called cell swelling is received by elastically designed compression pads without impairing a strength or compactness of the arrangement within the respective battery housing. With a number N of strip-shaped compression pads arranged on the at least one side of the heat-resistant separator plate, a number N–1 of flow channels are formed between the separator plate and the adjacent battery cell. Due to the temperature control fluid guided directly on the respective battery cell and the mechanical partition brought about according to aspects of the invention with the heat-resistant separator plate over an entire surface extension of the respective battery cell, a fire protection for the battery module according to aspects of the invention is advantageously increased compared to the prior art.

Further advantages and embodiments of the invention will emerge from the description and the accompanying drawing.

It goes without saying that the aforementioned features and the features yet to be explained in the following can be used not only in the respectively specified combination, but also in other combinations or on their own, without leaving the scope of the present invention.

BRIEF DESCRIPTION OF THE DRAWINGS

The figures are described in a coherent and comprehensive manner, and the same reference numbers are assigned to the same components.

DETAILED DESCRIPTION OF THE INVENTION

Figure 1:
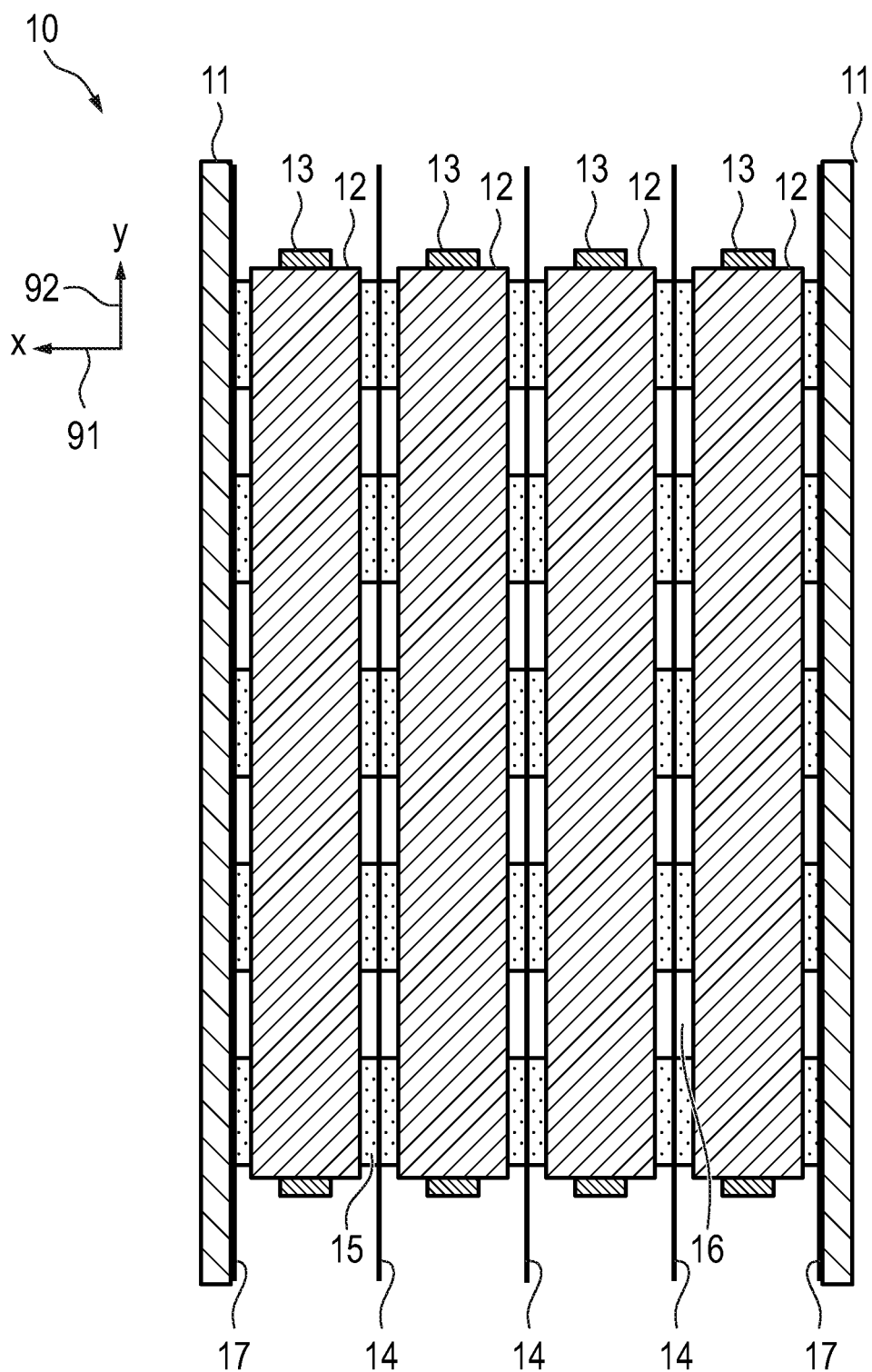
FIG. 1 schematically shows an xy sectional view perpendicular to the stacking direction, overseeing a configuration of the battery module according to aspects of the invention.

In FIG. 1, an xy sectional view 10 perpendicular to the stacking direction is shown schematically overseeing a configuration of the battery module according to aspects of the invention, wherein a plane of the xy sectional view 10 is subtended by an x direction 91 and a y direction 92. A cell stack of four battery cells 12, each having two terminals 13, is arranged in a module housing 11, wherein the x direction 91 corresponds to a stacking direction. A respective heat-resistant separator plate 14 is arranged between two battery cells 12, and (in a top view) a set of five strip-shaped compression pads 15 are arranged between the respective heat-resistant separator plate 14 and a respective adjacent battery cell 12. In a top view, a respective flow channel 16 is formed from two respective strip-shaped compression pads 15 and the directly adjacent respective heat-resistant separator plate 14 and the respective battery cell 12. In addition, a further heat-resistant separator plate 17 is also arranged on a respective wall of the module housing 11, which only comprises a set of also five strip-shaped compression pads 15 between itself and the respective battery cell stack on battery cells 12.

Figure 2:
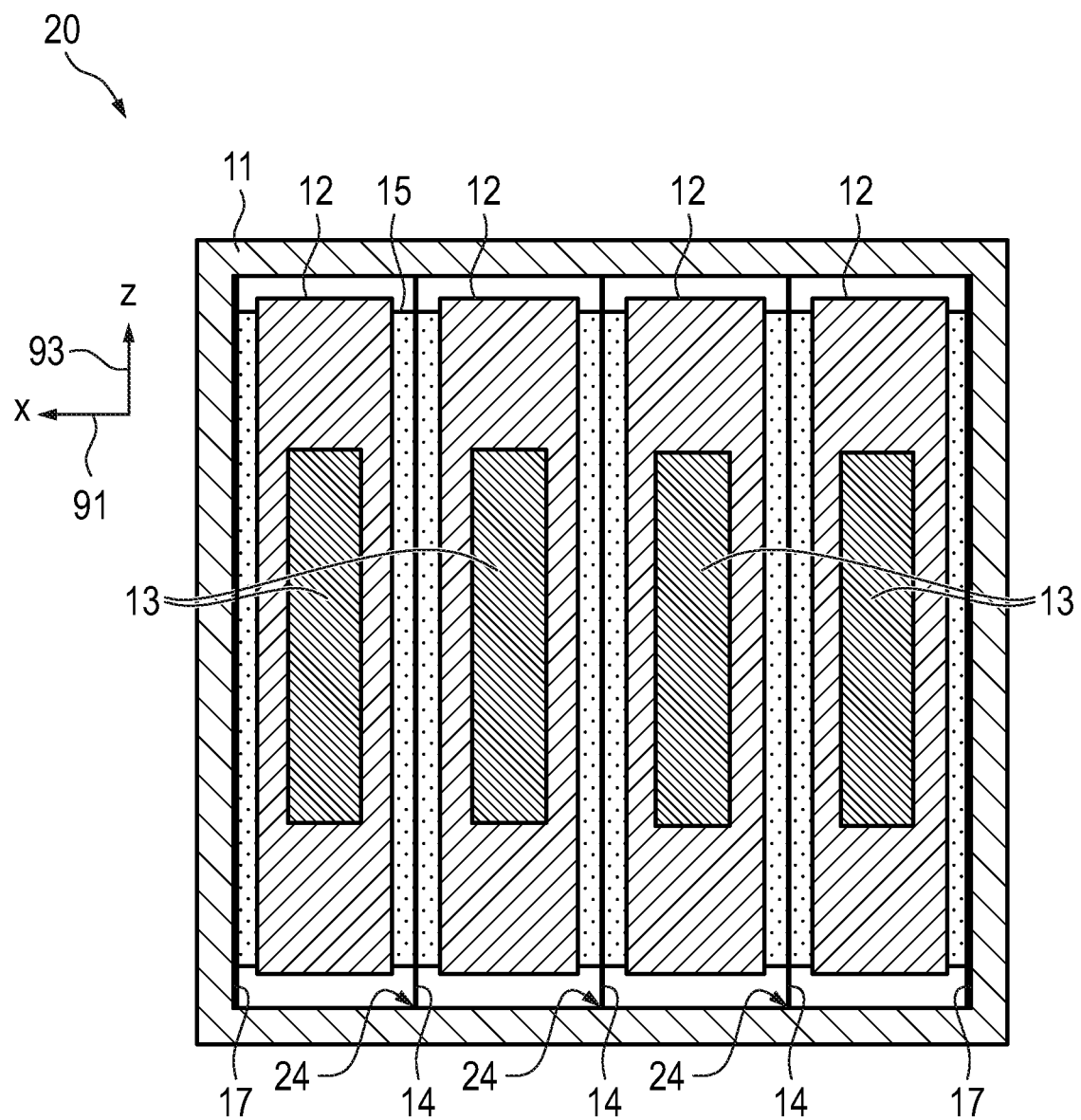
FIG. 2 schematically shows an xz sectional view perpendicular to the stacking direction of the configuration of the battery module according to aspects of the invention.

FIG. 2 shows an xz sectional view 20 perpendicular to the stacking direction of the configuration of the battery module according to aspects of the invention, wherein a plane of the xz sectional view 30 is subtended by the x direction 91 and a z direction 93. The respective separator plate 14 abuts the module housing 11 at respective locations 24, whereby the battery cells 12 are better spatially separated from one another.

Figure 3:
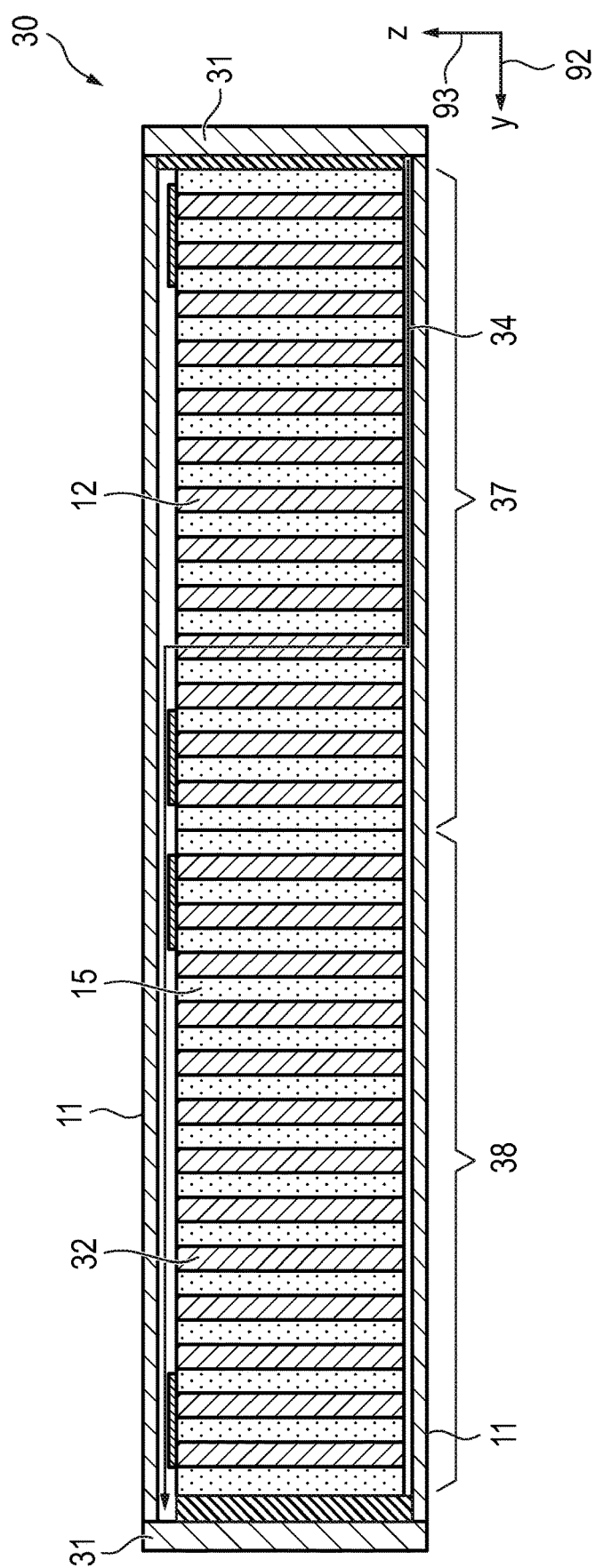
FIG. 3 schematically shows a yz sectional view in the stacking direction of a further configuration of a battery module according to aspects of the invention.

FIG. 3 shows a yz sectional view 30 in the stacked direction of a further configuration of the battery module according to aspects of the invention, wherein a plane of the yz sectional view 30 is subtended by the y direction 92 and the z direction 93. A respective housing cover 31 terminates the module housing in which two electrically cell stacks 37, 38 of battery cells 12, 32 are located in the y direction 92. Both cell stacks 37, 38 are provided with strip-shaped compression pads 15 according to aspects of the invention. The joined arrows 34 show an exemplary perfusion with a temperature control fluid.

LIST OF REFERENCE NUMBERS 10 xy sectional view
11 Module housing
12 Battery cell
13 HV terminal
14 Separator plate with bilaterally arranged compression pads
15 Compression pad
16 Flow channel
17 Separator plate with unilaterally arranged compression pads
20 xz sectional view
24 Separator plate abutting module housing wall
30 yz sectional view
31 Housing cover
32 Battery cell
34 Strand of the coolant flow
37 First cell stack with battery cells 12
38 Second cell stack with battery cells 32
91 x direction
92 y direction
93 z direction

What is claimed is:

1. A battery module comprising:
   a module housing,
   at least one cell stack having a plurality of battery cells each comprising a rectangular surface and a cell thickness perpendicular thereto in a stacking direction,
   at least one separator plate formed from a heat-resistant material, wherein a laminar extension of the at least one separator plate corresponds to at least the rectangular surface area of a respective battery cell, wherein the at least one separator plate is arranged between two adjacent battery cells of the at least one cell stack, and
   at least two strip-shaped compression pads arranged on at least one separator plate side of the at least one separator plate between a lower edge and an upper edge of the at least one separator plate,
   wherein the at least two strip-shaped compression pads directly abut the battery cell facing the at least one separator plate side having the at least two strip-shaped compression pads, such that, longitudinally between the at least two strip-shaped compression pads, the at least one separator plate, and the respective battery cell, a respective flow channel is disposed for holding a temperature control fluid,
   wherein, during operation, the battery module is perfusable or perfused with the temperature control fluid flowing through the respective flow channel.

2. The battery module according to claim 1, wherein the heat-resistant material of the at least one separator plate additionally has at least one of the following properties: combustion-resistant, burst-resistant, fracture-resistant, compression-resistant.

3. The battery module according to claim 1, wherein the heat-resistant material of the at least one separator plate is selected from one of the following materials: steel, fiber-reinforced plastic, ceramic, fiber-reinforced and ceramic.

4. The battery module according to claim 1, wherein the at least two strip-shaped compression pads are adhered to the at least one separator plate.

5. The battery module according to claim 1, wherein at least one edge of the at least one separator plate abuts the module housing.

6. The battery module according to claim 1, wherein the strip-shaped compression pads are arranged in a strip pattern on the at least one separator plate.

7. The battery module according to claim 1, wherein, between at least one respective wall of the module housing terminating the at least one cell stack in the stacking direction, a respective separator plate of the at least one separator plate is arranged, wherein the at least two strip-shaped compression pads are arranged only between the respective separator plate and the respective battery cell terminating at the at least one cell stack.

8. A motor vehicle comprising the battery module of claim 1.

9. A battery system comprising a temperature control system and at least one battery module according to claim 1, wherein the temperature control system is configured so as to provide a perfusion through the at least one battery module with a dielectric temperature control fluid.

10. In a battery module including (i) a module housing, (ii) at least one cell stack having a plurality of battery cells each comprising a rectangular surface and a cell thickness perpendicular thereto in a stacking direction, (iii) at least one separator plate formed from a heat-resistant material, wherein a laminar extension of the at least one separator plate corresponds to at least the rectangular surface area of a respective battery cell, wherein the at least one separator plate is arranged between two adjacent battery cells of the at least one cell stack, and (iv) at least two strip-shaped compression pads arranged on at least one separator plate side of the at least one separator plate between a lower edge and an upper edge of the at least one separator plate, wherein the at least two strip-shaped compression pads directly abut the battery cell facing the at least one separator plate side having the at least two strip-shaped compression pads, such that, longitudinally between the at least two strip-shaped compression pads, the at least one separator plate, and the respective battery cell, a respective flow channel is disposed for holding a temperature control fluid, wherein, during operation, the battery module is perfusable or perfused with the temperature control fluid flowing through the respective flow channel, a method of assembling the battery module comprises:

(i) adhering the at least two strip-shaped compression pads on the at least one separator plate with a heat-resistant adhesive in order to form a composite structure.

11. The method according to claim 10, wherein the composite structure is adhered with a heat-resistant adhesive:

(i) at contact locations of the strip-shaped compression pads with the respective battery cells, and
(ii) at contact locations of the at least one separator plate with the module housing when the battery module is assembled.

* * * * *